US008208848B2

(12) United States Patent
Daugherty, Jr. et al.

(10) Patent No.: US 8,208,848 B2
(45) Date of Patent: Jun. 26, 2012

(54) ENHANCED JAMMING DETECTION

(75) Inventors: Thomas H. Daugherty, Jr., Lantana, TX (US); Keith James Klamm, Garland, TX (US)

(73) Assignee: Enfora, Inc., Richardson, TX (US)

( * ) Notice: Subject to any disclaimer, the term of this patent is extended or adjusted under 35 U.S.C. 154(b) by 631 days.

(21) Appl. No.: 12/411,352

(22) Filed: Mar. 25, 2009

(65) Prior Publication Data
US 2010/0248667 A1 Sep. 30, 2010

(51) Int. Cl.
*H04K 3/00* (2006.01)
(52) U.S. Cl. ............................. 455/1; 340/669
(58) Field of Classification Search ........... 455/1, 456.1, 455/435.1, 404.1, 404.2, 426.1; 340/669
See application file for complete search history.

(56) References Cited

U.S. PATENT DOCUMENTS

| 6,901,264 | B2* | 5/2005 | Myr ........................... 455/456.5 |
| 2009/0047931 | A1* | 2/2009 | Nanda et al. .................. 455/411 |
| 2009/0291640 | A1* | 11/2009 | Bhattad et al. ............... 455/63.1 |
| 2010/0240396 | A1* | 9/2010 | Zhang et al. ............... 455/456.1 |
| 2010/0291907 | A1* | 11/2010 | MacNaughtan et al. ... 455/414.1 |

* cited by examiner

*Primary Examiner* — Henry Choe

(57) ABSTRACT

Systems and methods are disclosed that include measuring power within at least one part of a wireless frequency band. These systems and methods also include calculating a variance, a mean, and a mean-to-variance ratio based upon the power measured in at least one part of the wireless frequency band using a processor. In addition, these systems and methods include comparing the mean, variance, and mean-to-variance ratio to known thresholds and determining if jamming is present within the at least one part of the wireless frequency band.

21 Claims, 6 Drawing Sheets

ENHANCED JAMMING DETECTION

TECHNICAL FIELD

Generally, the invention relates to wireless networks and wireless devices, and, more particularly, to the detection of devices used to inhibit, or interfere with, signals within a wireless network.

BACKGROUND

Wireless networks are used to relay information for a number of different purposes. These purposes include, but are not limited to, the relaying of security information, sensor data, and positioning information. As wireless networks have become more prevalent, it has become more important to detect devices that may interfere with the operation of wireless networks.

Systems and methods that could detect devices that create interference are needed.

SUMMARY OF INVENTION

In one embodiment, a method is disclosed that includes measuring power within at least one part of a wireless frequency band. This method also include calculating a variance, a mean, and a mean-to-variance ratio based upon the power measured in at least one part of the wireless frequency band using a processor. In addition, this method includes comparing the mean, variance, and mean-to-variance ratio to known thresholds and determining if jamming is present within the at least one part of the wireless frequency band.

In another embodiment, a system is disclosed that includes a receiver, configured to receive wireless signals in a wireless band, and a processor. The processor is configured to determine if jamming is present within the wireless signals in the wireless band by comparing the mean and variance of the received signals to known thresholds.

In yet another embodiment, a method is disclosed that includes performing a full scan of a wireless band, measuring the power in the wireless band, and comparing the power in the wireless band with at least one threshold. This method also includes determining if an interference device is present in at least one part of the wireless band.

Before undertaking the DETAILED DESCRIPTION OF THE INVENTION below, it may be advantageous to set forth definitions of certain words and phrases used throughout this patent document: the terms "include" and "comprise", as well as derivatives thereof, mean inclusion without limitation; the term "or", is inclusive, meaning and/or; the phrases "associated with" and "associated therewith", as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

FIGS. 1 through 6, discussed below, and the various embodiments used to describe the principles of the present disclosure in this patent document, are by way of illustration only and should not be construed in any way to limit the scope of the disclosure. Systems and methods are disclosed herein that relate to the detection of signal interfere with wireless data transmissions, the signals referred herein as "jamming", and the detection thereof referred to "enhanced jamming detection" (EJD). EJD allows for the detection of interference sources. By detecting interference sources, in some embodiments, appropriate action may be taken, including, but not limited to the "marking" of channels within a frequency band. These and other embodiments will be discussed below.

Figure 1:
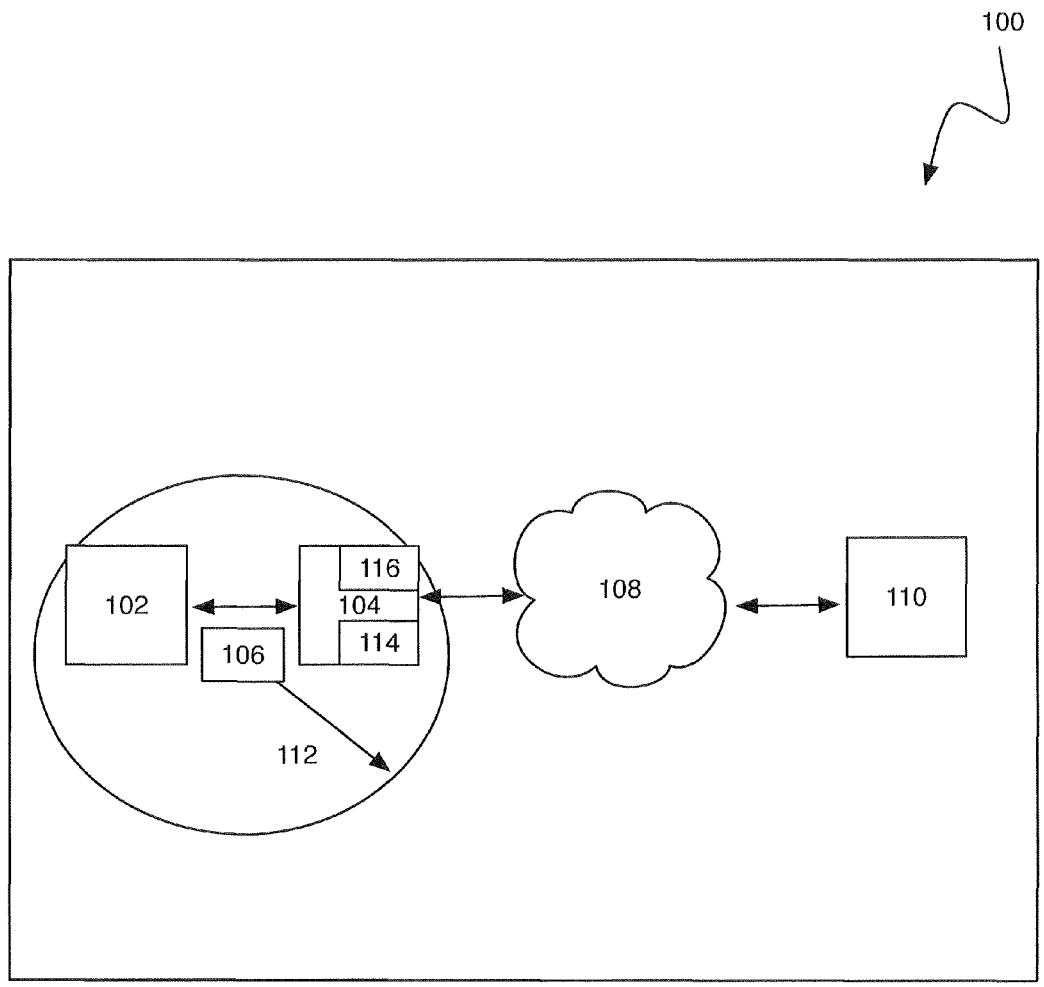
FIG. 1 is a block diagram of one system of implementing enhanced jamming detection (EJD)

FIG. 1 is an example of a system 100 in which EJD may be performed. In FIG. 1, a wireless client 102 communicates with a wireless gateway 104, which in turn communicates with a server 110 through a large area network 108. Also in this example, an interference device 106 (a device generating interference in the wireless network around client 102) is shown having an operational radius 112. Through the disclosed systems and methods, EJD preformed for detecting the presence and other operational characteristics of the interference device 106.

The wireless client 102 is any device capable of wireless communication with gateway 104. The client 102 may be a mobile handset, a computer, personal data assistant (PDA), or other device capable of communicating through a network to the gateway 104. In some embodiments, the client 102 is preferably a wireless capable communication device. It is also understood that the client 102 may have a plurality of sensors, positioning determining units (such as a location determining unit embodied as a GPS receiver) and/or other devices.

The gateway 104 is an intermediary device positioned between the large area network 108 and the wireless client 102. The gateway 104 may be implemented in wireless environments as a base station, network router, or other device that provides connectivity between the wireless client 102 and the large area network 108.

Embodied within the gateway 104 is an EJD device 114. It us understood that EJD 114 may be implemented in hardware or as a combination of hardware and software. As will be described herein, EJD 114 unit may be described It is understood that the EJD 114 is capable of using signals obtained from the antenna 116 within the gateway 104 to determine if jamming is present. While the EJD 114 is shown within the gateway 104, it is expressly understood that it may be embodied within the wireless client 102 or the server 110, or in another embodiment as a stand-alone device.

The large area network 108 is a network with a plurality of nodes capable of connecting a plurality of devices. In one embodiment, the large area network 108 may be the Internet. In another embodiment, the large area network 108 may be an intranet.

The server 110 is a computing device capable of interpreting information. The server 110 may be used to offload processing requirements of the EJD device 114, as well as perform reporting and auditing.

Figure 2:
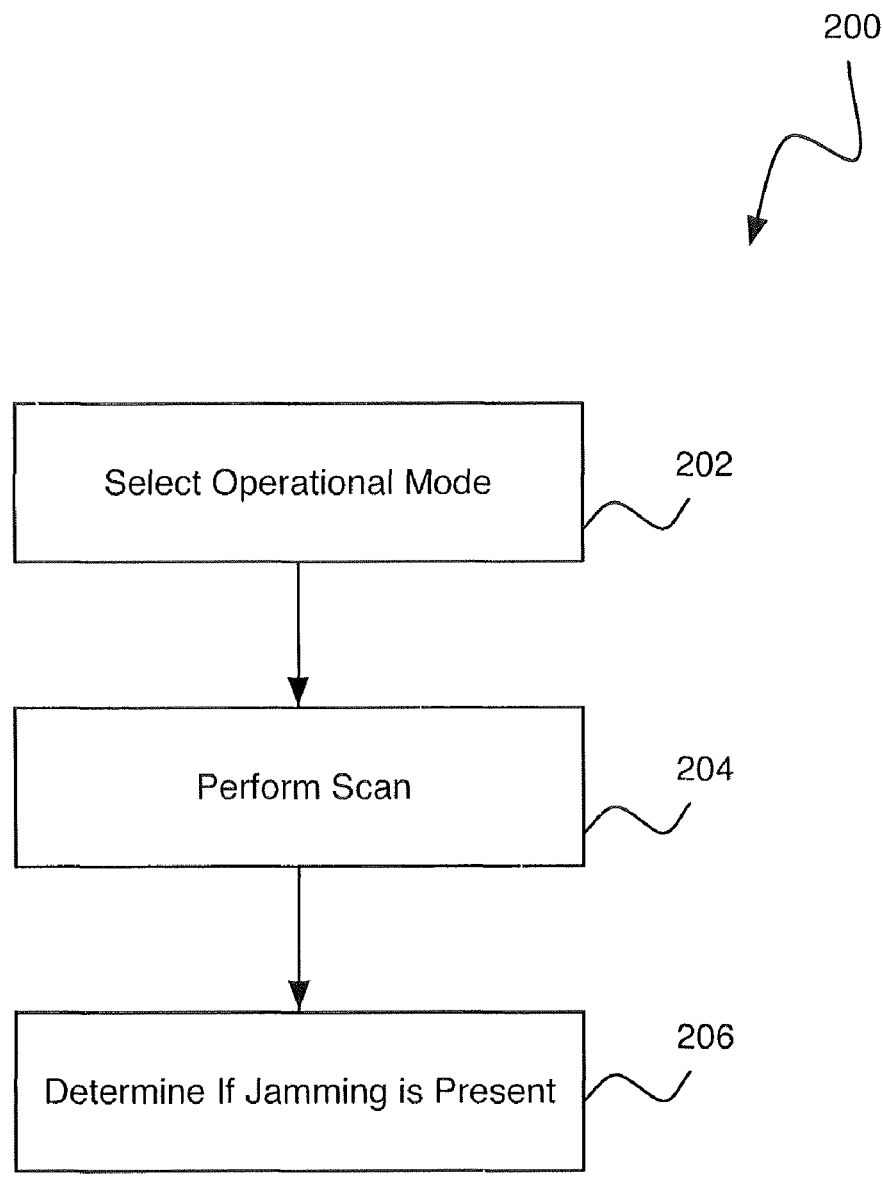
FIG. 2 is a flowchart of one method of implementing enhanced jamming detection (EJD)

FIG. 2 illustrates a high-level approach 200 used in one embodiment of the disclosure to detect jamming. In block 202, the EJD device 114 selects an operational mode. This operational mode may include parameters such as the frequency bands to scan, the channels within selected frequency bands to scan, the frequency of scanning, as well as whether the scanning will be on demand or at a predetermined frequency. In block 204, the scanning is performed. In block 206, there is a determination as to whether jamming is present.

Figure 3:
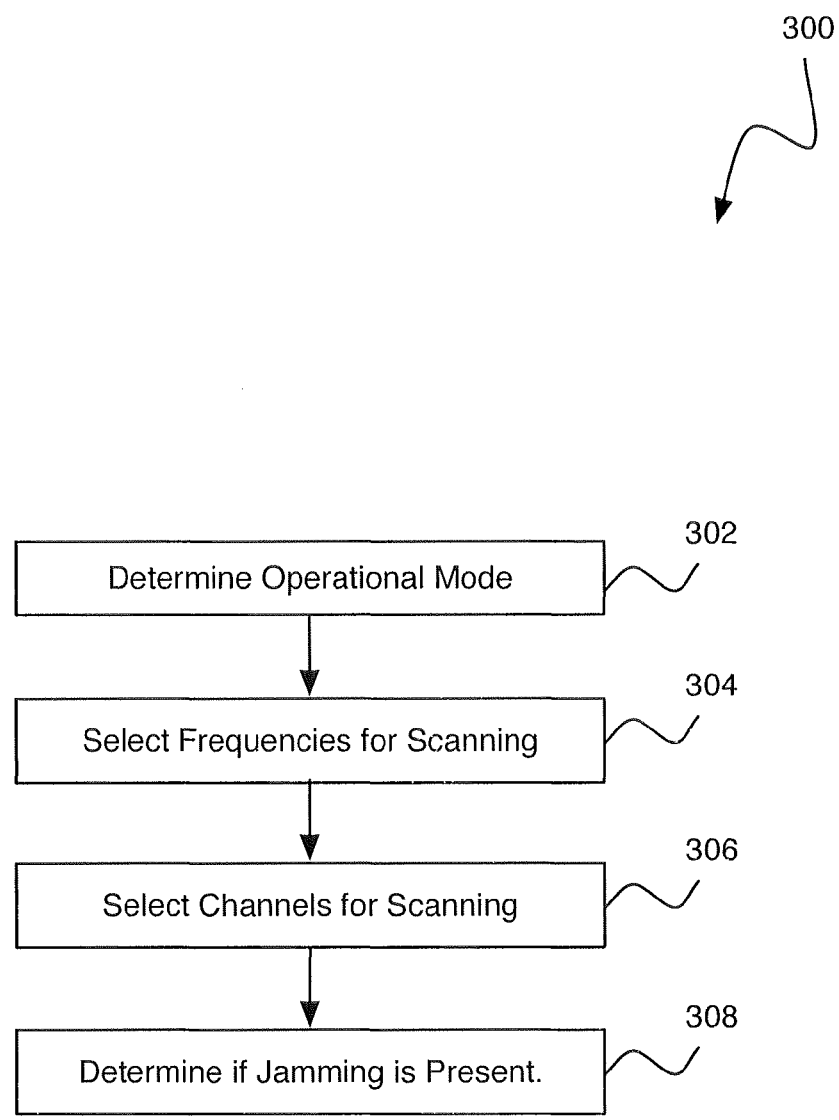
FIG. 3 is another flowchart of one method of implementing enhanced jamming detection (EJD)

FIG. 3 is an example of one method 300 of using the operational mode 202 through the EJD device 114. In block 302, the operational mode is determined. This operational mode comprises both selecting the bands (e.g., range of frequencies) to be scanned as well as whether the scans will be an "on demand" basis or performed at specific intervals. The phrase "on demand" refers to scanning which is performed as a result of another operation (such as a data transfer request). In block 304, a selection is made of frequencies to scan. In block 306, a determination is made as to whether jamming is present.

It is understood that if jamming has been determined to be present, a number of actions may be taken including, but not limited to, issuing alerts, marking frequencies as jammed, and increasing wireless power to overcome the jamming. Alerts that may be issued include visual and audio alerts that provide notification that jamming has been discovered. The marking of frequencies as jammed allows for frequencies that are currently jammed to be avoided. The increasing of the wireless power allows for a device to overcome detected interference.

It is preferable that, in some embodiments, the determination of whether jamming is present should be done following each cell selection scan (e.g., each time a wireless device attempts to create a connection). However, multiple determinations of whether jamming is present will provide additional information as to whether the interference device 106 creating the jamming is present. Performing additional scans will allow for both the detection of jamming and also the absence of previously detected jamming.

The determination of whether the interference device 106 is present may be performed through a jamming detection algorithm which is dependent on the calculation of the mean and variance of the power of the received signals as measured during a full cell selection scan (e.g., where a device scans all available channels prior to selecting a channel to communicate through). The mean calculation may refer to the average of a sequence of numbers. The variance may refer to a statistical dispersion that averages the squared distance of its possible values from the mean. It is understood that the square root of the variance is equal to the standard deviation.

In one embodiment, the mean and variance for each of the GSM bands (e.g., 450, 850, 900, 1800, and 1900) are calculated individually. This individual calculation allows for a determination as to whether a particular GSM band is being jammed. The following is a pseudo code example of one method of determining if jamming is present in a particular band using a measurement of power:

```
for (i = 0; i < number_of_channels; i++)
{
    power = (measured_power[i] / no_of_attempts);
    mean += power;
    sumSquared += (power * power);
}
meanSquared = (mean * mean)/number_of_channels;
mean = (mean+(number_of_channels/2)) /number_of_channels;
variance  =  ((sumSquared  −  meanSquared)  +
(number_of_channels/2)) /number_of_channels;
```

In this pesudo code, the variables that are not defined through other variables are defined as follows:

```
power = power that is measured divided by the number
    of attempts.
no_of_attempts = the number of measurements taken
number_of_channels = the number of channels being
    measured within a band
```

As shown by this pseudo code, the sum and power are squared for every channel in a particular band. Then, the power is measured and normalized. The meanSquared is obtained by dividing the mean squared by the number of channels. The mean is obtained by summing half of the number of channels with the mean and dividing by the number of channels. The variance is obtained by first multiplying the difference between the sumSquared and meanSquared for half of the number of channels. This result is divided by the number of channels to yield the variance.

It is understood that this algorithm is dependent on visibility of all channels within the band, and not just the strongest channels.

While an algorithm using the mean and variance is shown, it is understood that in other embodiments, such as where processing is performed by the gateway 104, or client 102, server 110, other algorithms may be used. As known to one skilled in the art, using the measurements, such as standard deviation, may give better measurements of differences of power within a band but may also require increased processor requirements.

Once the mean and variance have been computed, these combinations may be compared to known thresholds. Known thresholds may be obtained through calculations similar to those shown above in environments where it is known that no jamming is present, and then determining an acceptable level of interference. An acceptable level of interference is a level which does not substantially inhibit or prevent wireless communication.

Figure 4:
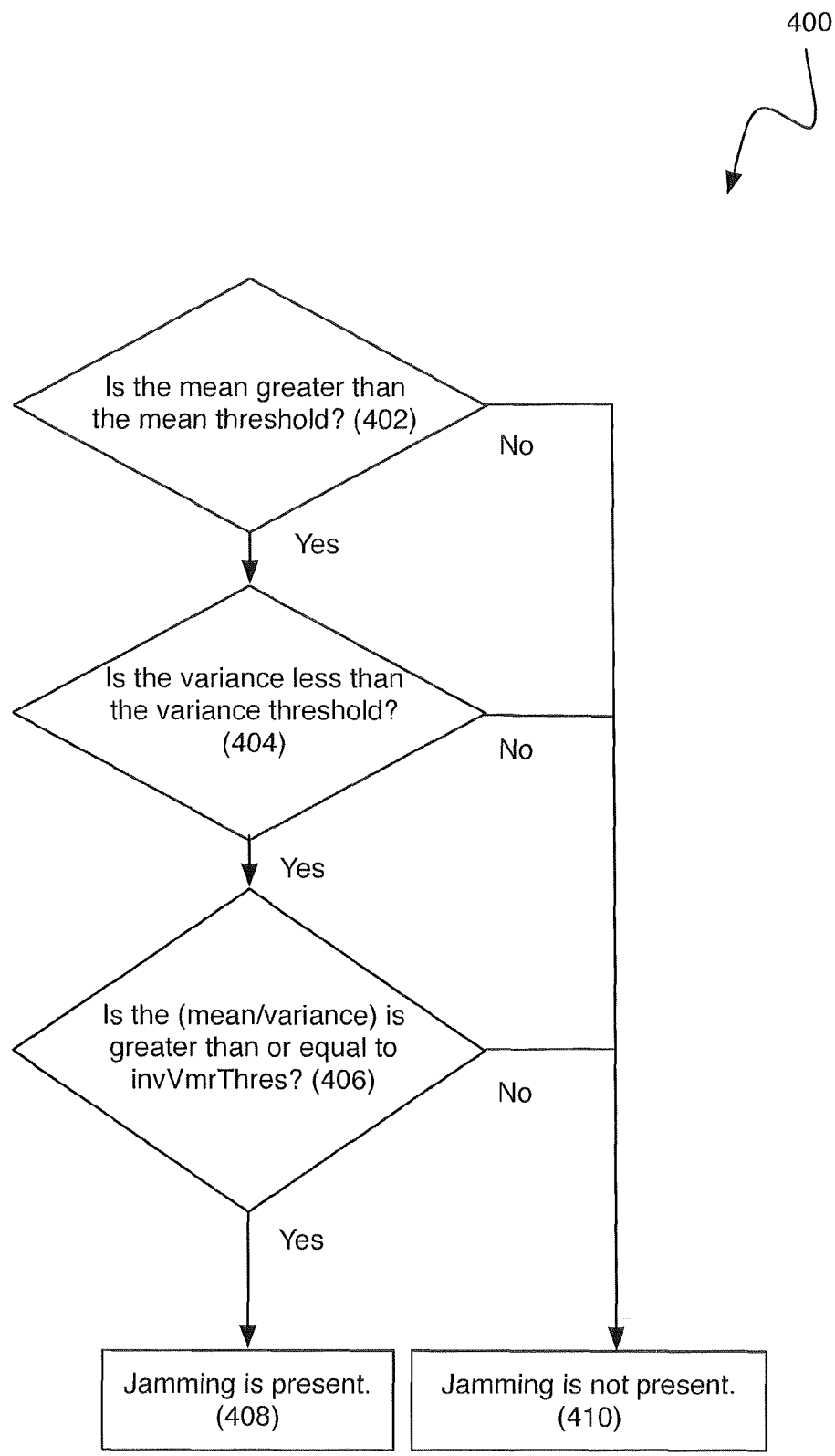
FIG. 4 is a flowchart illustrating one method of determining if jamming is present.

FIG. 4 is a decision tree illustrating how decisions are made in the present disclosure by comparing the combinations of the numbers discussed above. In block 402, there is a determination if the mean is greater than the mean threshold. If the mean is not greater than the mean threshold, then there is no jamming as shown in block 410. There is also a determination as to whether the variance is less that the variance threshold in block 404. If it the variance is less that the variance threshold then there is no jamming as shown in block 410. Finally, in block 406 there is a determination if the mean/variance is greater than or equal to the inverse variance to mean threshold. If the mean/variance is not greater than or equal to the inverse variance to mean threshold, then there is no jamming as shown in block 410. If the mean/variance is greater than or equal to the inverse variance to mean threshold, then there is jamming as shown in block 408.

Pseudo code for implementing the methods disclosed in FIG. 4 is shown below:

```
Jammed = FALSE
if (mean > meanThresh)
{
    if (variance < varThresh)
    {
        if ((mean/variance) >= invVmrThresh)
        {
            Jammed = TRUE
            // Send indication to event engine
        }
    }
}
```

In this pseudo code, the variables are defined as follows. "MeanThresh" is the minimum mean value of the receive level required before even considering the presence of the interference device 106. In some embodiments, the default value of MeanThresh can be set to a numerically weighted unit independent value of "10". "VarThresh" is the maximum allowed variance required. The smaller the variance, the more likely that the interference device 106 is present. In some embodiments, the default value of VarThresh can be set to a numerically weighted unit independent value of 9. "InvVmrThresh" is the minimum value for the inverse of the Variance-to-Mean Ratio required to declare jamming. This ratio is needed to prevent a false indication when the mean gets very small. In some embodiments, the default value of invVmrThresh can be set to a numerically weighted unit independent value of 3.

Figure 5:
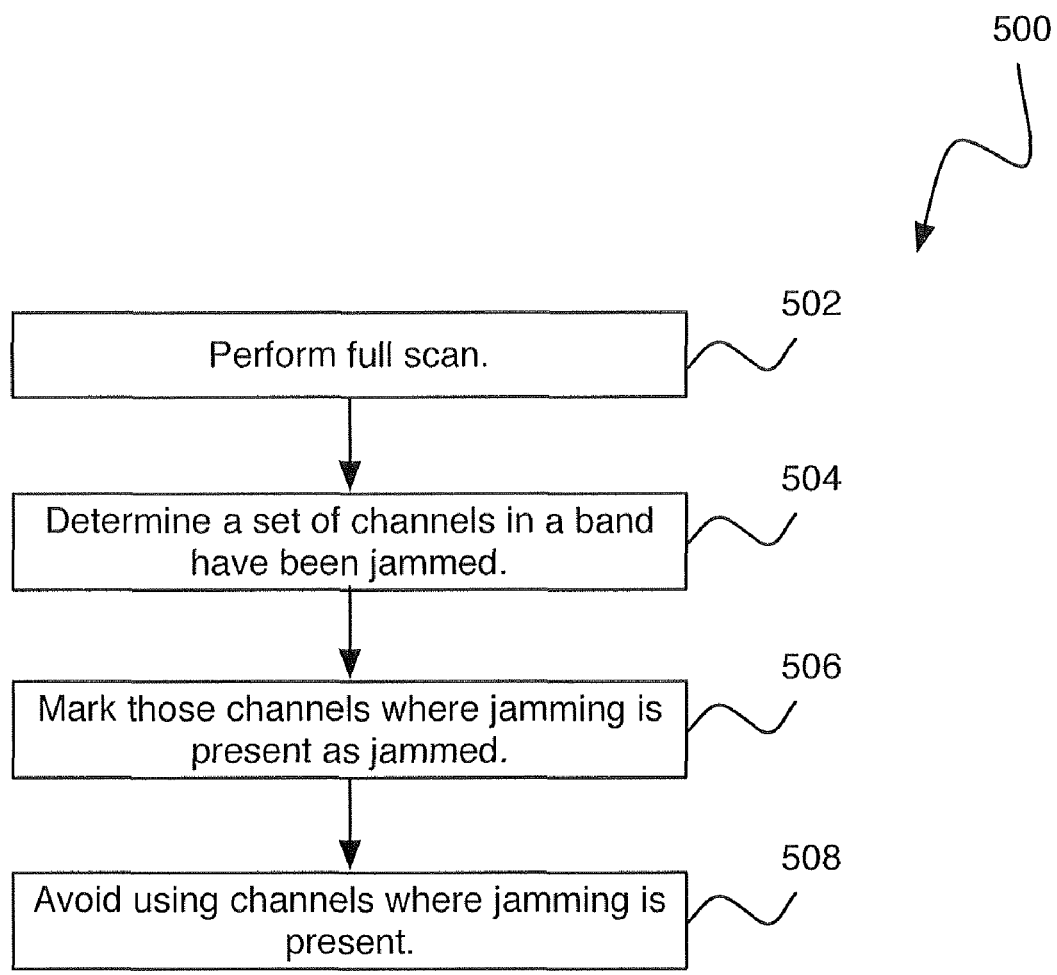
FIG. 5 is a flowchart illustrating one method of marking a channel as being jammed.

FIG. 5 is a flowchart illustrating in another embodiment 500 of the disclosure. While the previous examples have related to the scanning of a band to determine if jamming is present within the band, FIG. 5 is directed at applying the previously disclosed systems and methods to determining if jamming is present within a particular set of single channels within a frequency band. In block 502, a full scan is performed in a band. In block 504, there is a determination that particular channels within a band have been jammed. In block 506, the channels that are jammed are marked as being jammed. In block 508, those channels which have been jammed are avoided.

In wireless communications, entire bands, or channels within bands, may be marked as jammed. This allows wireless devices to avoid using either bands or specific channels within a band. With this information, initial connection times may be reduced as wireless devices will have information relating to channels or bands that should be avoided, and therefore the wireless devices will only attempt to connect over channels which have not been jammed. In addition, wireless communications may be made more reliable and faster through only communicating using bands or channels that have not been jammed.

The marking of channels as jammed have a number of advantages, including the ability to speed up wireless connections, as those channels that are known to be unavailable may be avoided by the client 102 and the gateway 104. Moreover, this information may be shared with a plurality of other wireless devices allowing the group of wireless devices to avoid a jammed channel.

It is understood that the marking of channels will be useful to any wireless device, and may be used to promote wireless connections that are initiated by any wireless device, client 102, or gateway 104. The use of the marked wireless channels as jammed will allow any device to either avoid a channel that has been jammed, increase the wireless transmission power to overcome the jamming, as well as notify other wireless devices of the jamming so that they may take appropriate measures to increase power or avoid a channel.

Figure 6:
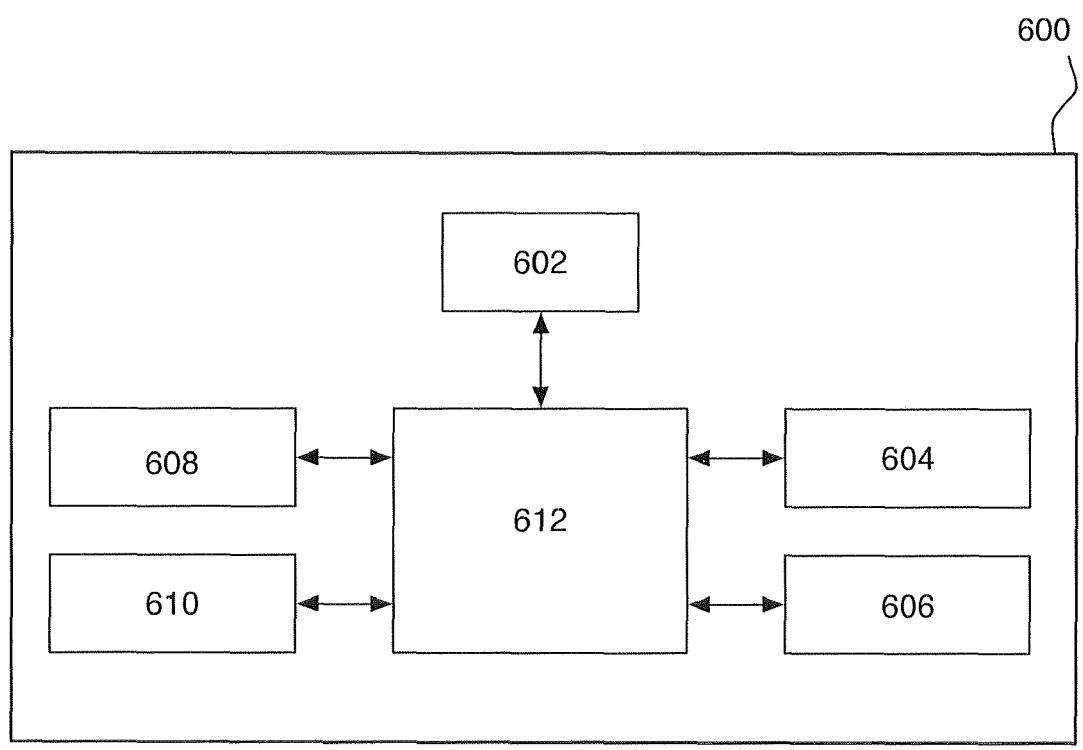
FIG. 6 illustrates a system suitable for implementing the several embodiments of the disclosure.

Client 102, gateway 104, and server 110 described above may be implemented on any system 600 with sufficient processing power, memory resources, and network throughput capability to handle the necessary workload placed upon it. FIG. 6 illustrates a system suitable for implementing one or more embodiments disclosed herein. The system 600 includes a processor 612 (which may be referred to as a central processor unit or CPU) that is in communication with memory devices including secondary storage 602, read only memory (ROM) 604, random access memory (RAM) 606, input/output (I/O) 608 devices, and network connectivity devices 610. The processor may be implemented as one or more CPUs.

The secondary storage 602 is typically comprised of one or more disk drives or tape drives and is used for non-volatile storage of data and as an over-flow data storage device if RAM 606 is not large enough to hold all working data. Secondary storage 602 may be used to store programs that are loaded into RAM 606 when such programs are selected for execution. The ROM 604 is used to store instructions and perhaps data that are read during program execution. ROM 604 is a non-volatile memory device that typically has a small memory capacity relative to the larger memory capacity of secondary storage. The RAM 606 is used to store volatile data and perhaps to store instructions. Access to both ROM 604 and RAM 606 is typically faster than to secondary storage 602.

I/O 608 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. The I/O devices may be configured to provide alerts, including audio and video alerts, when an interference device 106 is detected.

These network connectivity devices 610 may enable the processor 612 to communicate with a data network, or an Internet or one or more intranets. With such a network connection, it is contemplated that the processor 612 may receive information from the network 108, or may output information to the network 108 in the course of performing the above-described method steps. Such information, which is often represented as a sequence of instructions to be executed using processor 612, may be received from and/or transmitted to the network 108, for example, in the form of a computer data signal embodied in a carrier wave.

Such information, which may include data or instructions to be executed using processor 612 for example, may be received from and outputted to the network, for example, in the form of a computer data baseband signal or signal embodied in a carrier wave. The baseband signal or signal embodied in the carrier wave generated by the network connectivity devices 610 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 612 executes instructions, codes, computer programs, scripts that it accesses from hard disk, floppy disk, optical disk (these various disk based systems may all be considered secondary storage 602), ROM 604, RAM 606, or the network connectivity devices 610. The processor 612 may also be used to determine that an interference device 106 is present.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other products shown or discussed as directly coupled or communicating with each other may be coupled through some interface or device, such that the products may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

It should be understood that although an exemplary implementation of one embodiment of the present disclosure is illustrated above, the present system may be implemented using any number of techniques, whether currently known or in existence. The present disclosure should in no way be limited to the exemplary implementations, drawings, and techniques illustrated above, including the exemplary design and implementation illustrated and described herein, but may be modified within the scope of the appended claims along with their full scope of equivalents.

What is claimed is:

1. A method, comprising:
   measuring power within at least one part of a wireless frequency band;
   calculating a variance, a mean, and a mean-to-variance ratio based upon the measured power, wherein the calculation is performed through at least one processor;
   comparing the mean, variance, and mean-to-variance ratio to known thresholds;
   determining if jamming is present within the at least one part of the wireless frequency band.

2. The method of claim 1, further comprising creating an alert upon the determination that jamming is present.

3. The method of claim 2, further comprising upon determining that jamming is present, marking at least one part of the wireless band or channel as being jammed.

4. The method of claim 1, wherein the method is performed in a wireless gateway.

5. The method of claim 1, wherein the method is performed at a predetermined interval.

6. The method of claim 3, wherein the marking of the at least one part of the wireless band as being jammed is used to decrease the time needed to create a wireless connection.

7. A system, comprising:
   a receiver, wherein the receiver is configured to receive wireless signals in a wireless band; and
   a processor, wherein the processor is configured to determine if jamming is present within the wireless signals in the wireless band by comparing the mean, variance, and mean-variance ratio of the received signals to known thresholds.

8. The system of claim 7, wherein the system is performed in a mobile device.

9. The system of claim 8, wherein the system is performed in a base station.

10. The system of claim 8, wherein the system is further capable of determining which channels within the band are being jammed.

11. The system of claim 7, wherein the wireless band is a GSM band.

12. The system of claim 10, further comprising a transmitter, wherein the transmitter indicates to at least one other device that certain channels have been jammed.

13. The system of claim 12, wherein the channels that have been jammed are avoided as being unusable by at least one wireless device.

14. The system of claim 7, wherein the processor provides a notification that jamming is present.

15. A method, comprising:
    performing a full scan of a wireless band;
    measuring the power in the wireless band;
    comparing the measured power in the wireless band with at least one threshold;
    determining if an interference device is present in at least one part of the wireless band; and
    upon determining that an interference device is present in the at least one part of the wireless band, marking the at least one part of the wireless band as being jammed.

16. The method of claim 15, wherein the method is performed in a wireless gateway.

17. The method of claim 15, wherein the method is performed at a predetermined interval.

18. The method of claim 15, wherein the marking of the at least one part of the wireless band as being jammed is used to decrease the time needed to create a wireless connection.

19. The method of claim 15, wherein mean and variance of the measured power are used to determine if jamming is present.

20. A method, comprising:
    performing at least part of a full scan of at least one part of a wireless band;
    calculating a variance, a mean, and a mean-to-variance ratio based upon the at least part of the full scan of the at least one part of the wireless band of the power observed, wherein the determination is performed through at least one processor;
    comparing the calculated mean, variance, and mean-to-variance ratio to known thresholds;
    determining if an interference device is present in at least one part of the wireless band; and
    creating a notification upon the determination that the interference device is present.

21. The method of claim 20, wherein the notification is a visual notification.

* * * * *